Dec. 15, 1964  K. MULLER  3,160,959
GEAR CHECKING INSTRUMENTS

Filed March 2, 1962  3 Sheets-Sheet 1

Dec. 15, 1964     K. MULLER     3,160,959
GEAR CHECKING INSTRUMENTS
Filed March 2, 1962     3 Sheets-Sheet 2
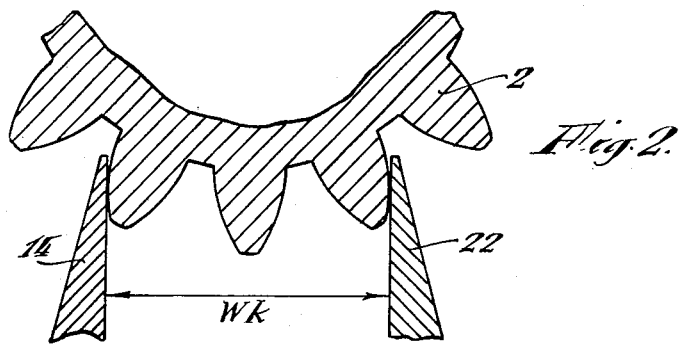
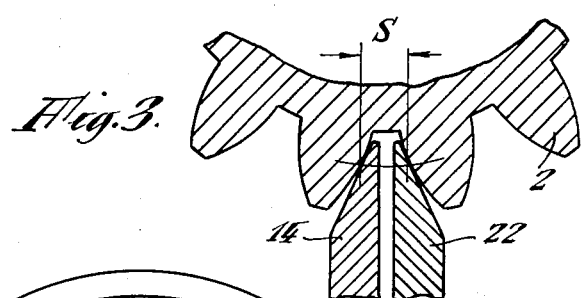
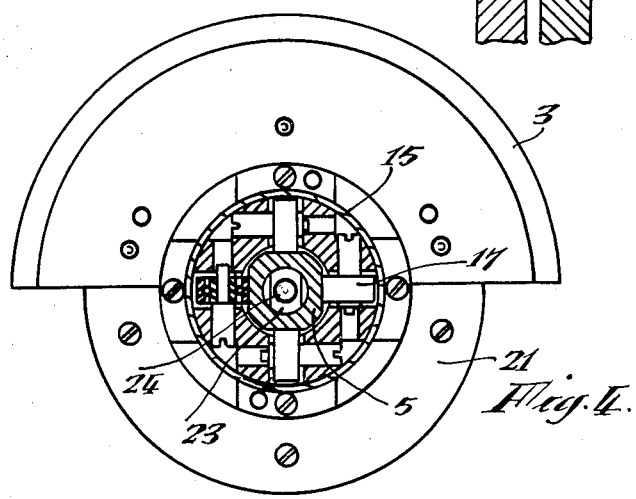

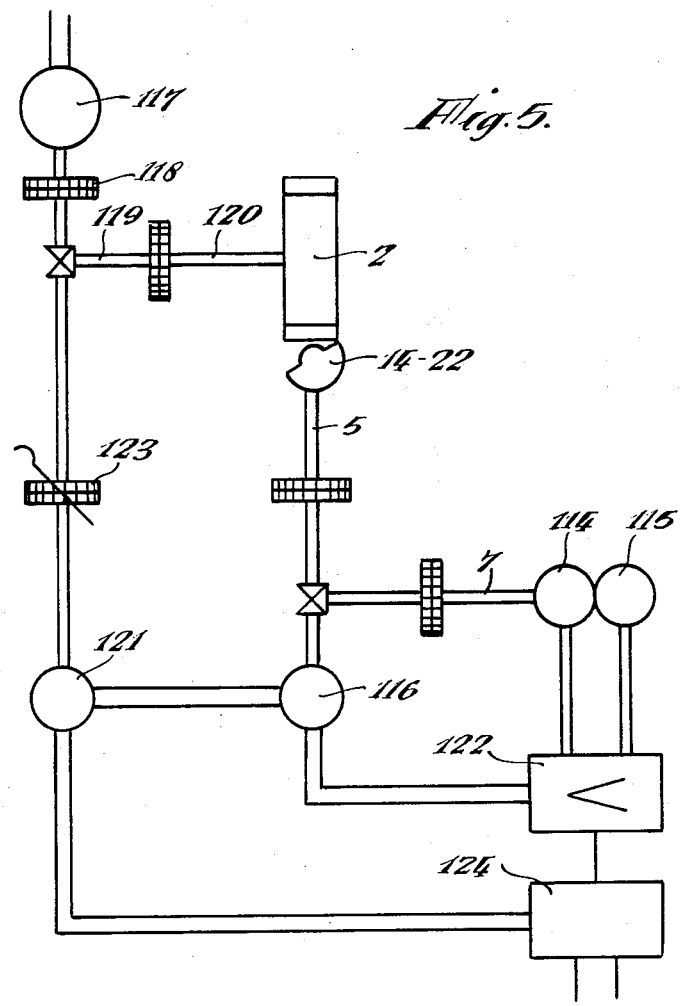

United States Patent Office 3,160,959
Patented Dec. 15, 1964

3,160,959
GEAR CHECKING INSTRUMENTS
Karl Muller, Zurich, Switzerland, assignor to Maag Gear Wheel & Machine Company Limited, Zurich, Switzerland, a company of Switzerland
Filed Mar. 2, 1962, Ser. No. 177,053
Claims priority, application Germany, Mar. 7, 1961, M 48,301
6 Claims. (Cl. 33—179.5)

This invention relates to a gear checking instrument or gear tester comprising two measuring jaws for measuring the distance between two tooth flanks of a gear, the two measuring jaws being disposed on a rotating measuring spindle which performs one revolution per measurement operation. The invention is an improvement on applicant's U.S. Patent No. 3,089,249 dated May 14, 1963.

Testers of this kind are used more particularly to measure distances on the line of action of the tooth flanks —that is, on the common normal of two tooth flanks— but can also be used to measure the width of tooth spaces and operate automatically. However, testers of this kind cannot be used to test a gear while it is actually on the gear-cutting machine, more particularly if the gear to be tested is driven continuously.

According to the invention, the measuring spindle rotates in a desired relationship to the gear to be tested, and the measuring spindle can be moved axially together with the measuring head, the teeth of the gear to be tested displacing the measuring spindle and measuring head intermittently against a unidirectionally operative force, the measurement being performed during such displacement.

A gear tester according to the invention is illustrated in the accompanying drawings by way of example and in diagrammatic form and as an individual apparatus. In the drawings:

FIG. 2 shows a part of the apparatus when being used to measure tooth width over a number of teeth;

FIG. 3 shows part of the apparatus when being used to measure a tooth space;

FIG. 4 is a cross-section taken on the line IV—IV in FIG. 1; and

FIG. 5 illustrates a system for connecting the measuring spindle to a gear which it is required to test.

Figure 1:
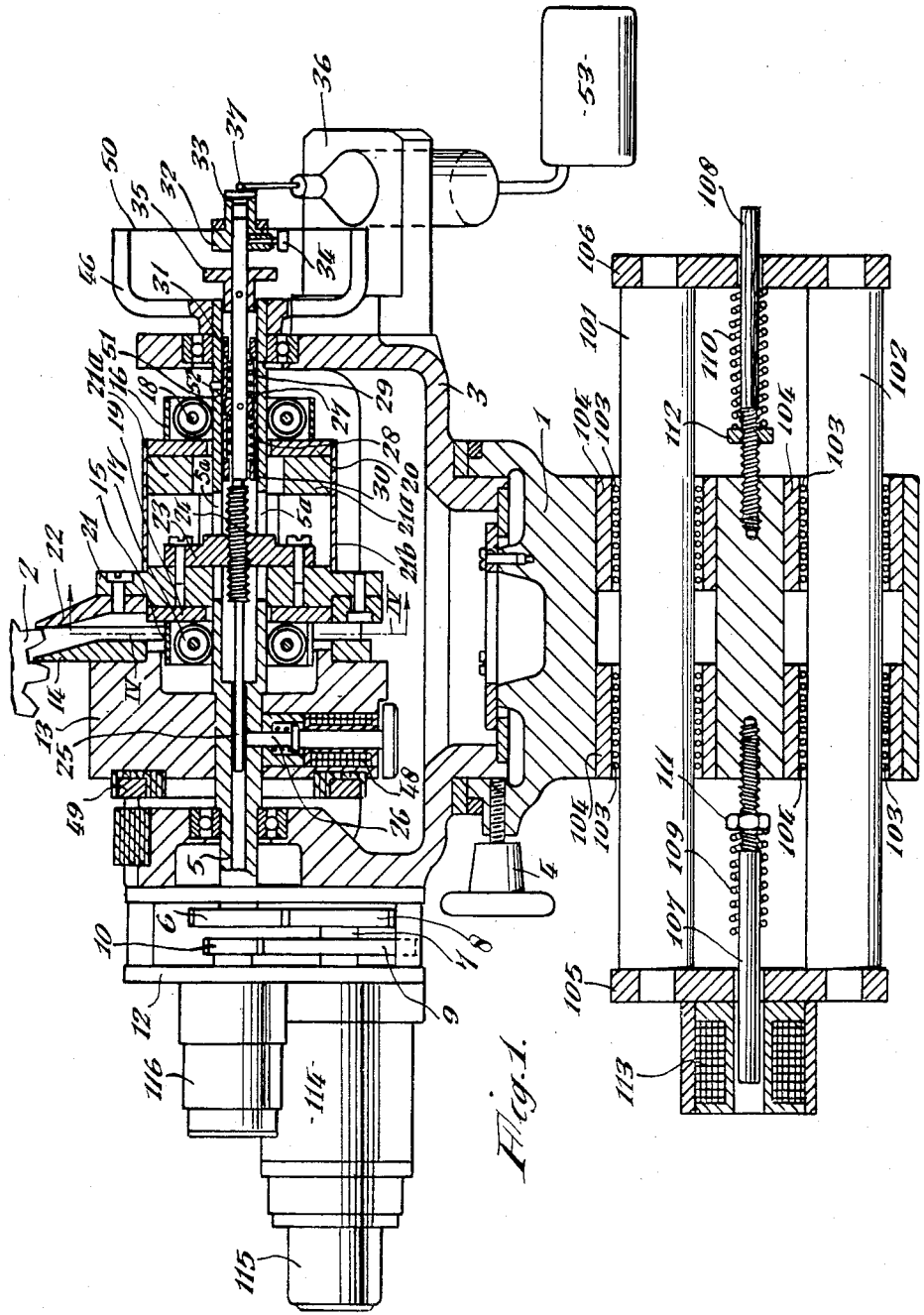
FIG. 1 is a partial longitudinal section through the measuring spindle and measuring head, the measuring jaws being in engagement with a gear to be tested and measuring the distance between two consecutive left-hand flanks.

Referring to FIG. 1, a measuring head 1 of a gear tester is mounted for movement on two guide shafts 101, 102, mobility being assisted by balls 103 disposed in bushings 104 secured in the head 1. The two shafts 101, 102 are secured in flange bearings 105, 106 which are borne by a frame (not shown) of the gear tester, such frame comprising the means for retaining a gear 2 to be tested. Two pins 107, 108 are secured in the head 1 between the two shafts 101, 102 and extend through the bearings 105, 106. Compression springs 109, 110 and adjusting nuts 111, 112 are disposed on the pins 107, 108. The spring 110 provides a force opposed to axial movement of the measuring head 1 to the right as viewed in FIG. 1, whilst the spring 109 provides a means for damping the return axial movement of the measuring head, under the influence of the spring 110 as hereinafter described. Disposed on the bearing 105 is a damping magnet 113 into which the pin 107 extends, to provide additional damping means.

A casing 3 is pivotable in the head 1 in order that it may be adjusted in accordance with the tooth angle of the gear 2. A screw 4 retains the casing 3 in the required angular position, about a horizontal axis, relative to the head 1. A measuring spindle 5 is rotatably mounted in the casing 3 and is driven by a gear 6, by a gear 8 disposed on a spindle 7 and an associated servo-motor 114 connected with a receiver synchromotor 116 by means of a gear 9 and pinion 10. The servomotor 114 and receiver synchromotor 116 are connected to the casing 3 by way of a flange 12. A ring 13 is secured to the rotating measuring spindle 5 and a measuring jaw 14 is secured to the ring 13. The jaw 14 is semi-circular.

An axially moving group comprising protective rings 15 and 16 each with four rollers 17 and 18, respectively, is disposed on the measuring spindle 5; between the rings 15 and 16 flanges 19 and 20 are secured to a carrier 21 by a ring 21a and a sleeve 21b, and a measuring jaw 22 is secured to the carrier 21 and can therefore move axially on the measuring spindle 5. The measuring jaw 22 also is semi-circular. The rollers 17 and 18 prevent the measuring spindle 5 from rotating relative to the jaw 22 because the spindle 5 is of substantially square cross-section near the rollers 17 and 18, as can be seen in FIG. 4. Also, the spindle 5 is formed with diametrical slots 5a through which extend a rod 23 rigidly secured to the carrier 21. The rod 23 is formed, co-axially with the measuring spindle 5, with a tapped aperture in which threaded rod 24 engages. Any motion of the axially movable measuring jaw 22 is therefore imparted to the rod 24. The rod 24 has an extension 25 which can be locked to the measuring spindle 5 by means of a magnetically operated clamping pin 26. The rod 24 is provided with a collar 27, and disposed one each on either side of the collar 27, springs 28 and 29 bear against end collars 30, 31 in a sleeve 51 which is adjustably secured within the spindle 5 by a screw 52, the springs 28, 29 tending to retain the rod 24 in a desired central position. Disposed on the outer end of the rod 24 is a collar 32 having a cap 33 and lockable on the rod 24, when adjusted to a desired position, by means of a screw 34. A slide 36 is secured to the casing 3 and has a feeler 37 through which axial movements of the rod 24 are transmitted to an indicating device 53. A yoke 46 on the casing 3 carries the end of the rod 24 with the interposition of a spring strip 50 in which the rod 24 is mounted without friction at its right-hand end by way of the collar 32 and which is substantially straight when in its central position.

In FIG. 1, the measuring jaws 14 and 22 are arranged to measure the engagement or base pitch of the gear 2.

In FIG. 2, the measuring jaw 14 is arranged differently and tooth width $Wk$ is measured over a number of teeth. FIG. 3 shows how, with the jaws 14, 22 arranged in yet another way, the tooth space $s$ can be measured. The spacing of the jaws is effected by rotating the screw threaded rod 24 by means of the knob 35 and re-fixing the sleeve 51 by means of the grub screw 52.

Referring to FIG. 5, the main driving motor 117 of the gear tester drives a spindle 119 through gearing 118. Reduction gearing is provided between the spindle 119 and spindle 120 on which the gear wheel 2 to be tested is disposed.

The measuring spindle 5, with the jaws 14, 22, performs one revolution per tooth pitch of the gear to be tested—in order that the jaws will again be in position to measure the pitch of the next teeth, and therefore the spindle 5 must run in synchronism with the shaft 119 and shaft 120 as determined by a transmission ratio dependent upon the number of teeth of the gear being tested.

As the spindle 5 rotates (FIG. 1), the measuring head 1 moves along the shafts 101, 102, against the force exerted by the spring 110, in accordance with the rotation of the gear 2 to be tested, and thereby the jaws 14, 22 in engagement with the tooth flanks are moved together axially. After the spindle 5 has performed part of a revolution, sufficient for the jaws 14, 22 to be disengaged from the teeth of the gear 2, the casing 3 and the measuring head 1 are returned, by the spring 110, to their initial axial positions with the jaws in position to engage the next teeth, the said return movement being damped by the spring 109 and the magnet 113.

Synchronisation between the gear to be tested—that is, between the shafts 119 or 120 (FIG. 5) and the measuring spindle 5 is provided by means of an electric self-synchronizing device and the servomotor 114, the electric self-synchronizing device comprising an inductive transmitter synchro 121 coupled with the shaft 119, and an inductive receiver synchro 116 coupled with the spindle 5 and also driven by the servomotor 114 through reduction gearing and shaft 7. If a deviation in the spindle position occurs as between the synchro 121 and the synchro 116, an error voltage is initiated which, in association with an electronic amplifier 122, causes the servomotor to rotate, in a sense depending upon the positive or negative direction of the deviation or error, until the error is reduced to zero. For continuous operation of the tester this means that, if the gear 2 to be tested rotates at a constant speed, the measuring spindle 5 must lag, in proportional synchronism by not more than a minimum error within the limits of tolerance, for the servomotor 114 to rotate at the required speed. To ensure a stable synchro action free from hunting of the measuring spindle 5, the casing of the servomotor 114 comprises, in addition to the motor, a tachometer generator 115, the voltage of which is degeneratively applied to the amplifier 122 to stabilize the control loop electrically.

As already specified, the measuring spindle 5 performs one complete revolution per tooth pitch rotation of the gear to be measured. Consequently, the synchronisation ratio (transmission ratio) between the gear 2 to be tested and the measuring spindle 5 must be equal to the number of teeth on the gear 2. If a gear with a different number of teeth is to be tested, the synchronisation ratio must be altered correspondingly. Conveniently, an infinitely variable transmission 123 is provided between the gear 2 and the transmitter synchro 121, the ratios provided by the transmission 123 corresponding to the number of teeth on gears with which the apparatus has to deal. Conveniently, a power pack 124 precedes the electric self-synchronizing device.

The gear tester according to the invention operates as follows:

After a gear 2 to be tested has been secured to the spindle 120, the measuring jaw 14 is engaged with the corresponding tooth flank of the gear, the spindle 120 being rotated readily. The measuring jaw 22 is then brought into engagement at a slight measurement pressure with the required tooth flank of the gear 2 by rotation of the knob 35 and corresponding adjustment of the sleeve 51 and securing of the sleeve by means of the screw 52.

To test the gear 2, the driving motor 117 and the electric self-synchronizing device which drives the measuring spindle 5 continuously are started. Whilst the jaws 14 and 22 remain engaged with the tooth flanks, the measured value between the said flanks is recorded on the indicator 53 by way of the jaw 22, carrier 21, rods 23, 24, collar 32, cap 33 and feeler 37. As the spindle 5 continues to rotate beyond this zone in which the jaws engage the tooth flanks, the electromagnet 48 is energised briefly before the said zone is left, so that the extension 25 of the rod 24 is locked to the spindle 5. The gear 2 continues to be rotated at the rate of one pitch for each rotation of the spindle 5. When the jaws 14 and 22 return, by rotation of the spindle 5, into the said zone, the electromagnet 48 is de-energised so that the measurement of the next pitch is effected and recorded. The operation of the magnet 48 is controlled by a slip-ring-like contact plate 49 on the ring 13. In the construction described, therefore, one automatic measurement is provided per one revolution of the rotating measuring spindle 5. The tester can be stopped in known manner when the spindle 5 has performed the number of revolutions corresponding to the number of teeth on the gear 2.

The tester according to the invention is of use not only for testing the straight-toothed pinions illustrated in the drawings, but also for generally testing gears and articles having a tooth-like profile, such as helical pinions, toothed racks and rack shaped cutters or bevel gears.

Also, the tester can be fitted to a gear-cutting machine; in such an event the article 2 to be tested is with advantage driven continuously by the gear-cutting machine and the tester ceases to be an individual appliance. The drive is then provided, not by the driving motor 117, but by the same drive as is used to drive the work-piece, the electric self-synchronizing device being arranged after the fashion shown in FIG. 5. The article to be tested is then, of course, clamped to the work spindle or to the work table of the gear-cutting machine.

What I claim and desire to secure by Letters Patent is:

1. A gear checking instrument of the type having two measuring jaws for engaging two tooth flanks of a member having a gear teeth-like profile for measuring the distance between such engaged tooth flanks, the two measuring jaws being disposed on a rotatable measuring spindle mounted in a measuring head, characterized in that the instrument comprises means for progressively moving continuously the toothed member to be tested, the measuring spindle is rotatably coupled to the means for moving the member so as to rotate one complete revolution for each tooth pitch movement of the said member, the measuring spindle and the measuring head being movable as a unit axially of the measuring spindle and being effected by reason of the movement of the measuring jaws when in engagement with the moving tooth flanks of the said member, and resilient means normally opposing the said axial movement of the measuring head, said resilient means being operative to return said measuring head and spindle axially when the measuring jaws during rotation of the spindle and jaws move out of contact with said tooth flanks.

2. A gear checking instrument of the type having two measuring jaws for engaging two tooth flanks of a rotatable gear to be tested for measuring the distance between such engaged tooth flanks, the two measuring jaws being disposed on a rotatable measuring spindle mounted in a measuring head, characterized in that the instrument comprises means for progressively rotating continuously the gear to be tested, the measuring spindle is rotatably coupled to the means for moving the gear so as to rotate one complete revolution for each tooth pitch movement of the said gear, the measuring spindle and the measuring head being movable as a unit axially of the measuring spindle and being effected by reason of the movement of the measuring jaws when in engagement with the rotating tooth flanks of the said gear, and resilient means normally opposing the said axial movement of the measuring head, said resilient means being operative to return said measuring head and spindle axially when the measuring jaws during rotation of the spindle and jaws move out of contact with said tooth flanks.

3. A gear checking instrument according to claim 2 characterized in that the rotatable coupling between the measuring spindle and the gear to be tested comprises an electric synchronizing device.

4. A gear checking instrument according to claim 2 characterized in that the resilient means normally providing the force opposing axial movement of the measuring head is a spring and means are provided for cushioning the return movement of said measuring head.

5. A gear checking instrument according to claim 2 characterized in that the measuring jaws are substantially semi-circular in plan.

6. A gear checking instrument according to claim 2 characterized in that the drive for the instrument and for the gear to be tested is provided by the driving motor of a gear cutting machine.

References Cited in the file of this patent
UNITED STATES PATENTS 2,326,368    Kullman et al. ---------- Aug. 10, 1943

FOREIGN PATENTS 1,235,117    France ---------------- May 23, 1960